July 2, 1957    A. W. TONDREAU    2,797,626
COLOR FILM TESTER
Filed June 23, 1953    10 Sheets-Sheet 1

INVENTOR.
Albert W. Tondreau

INVENTOR.
Albert W. Tondreau

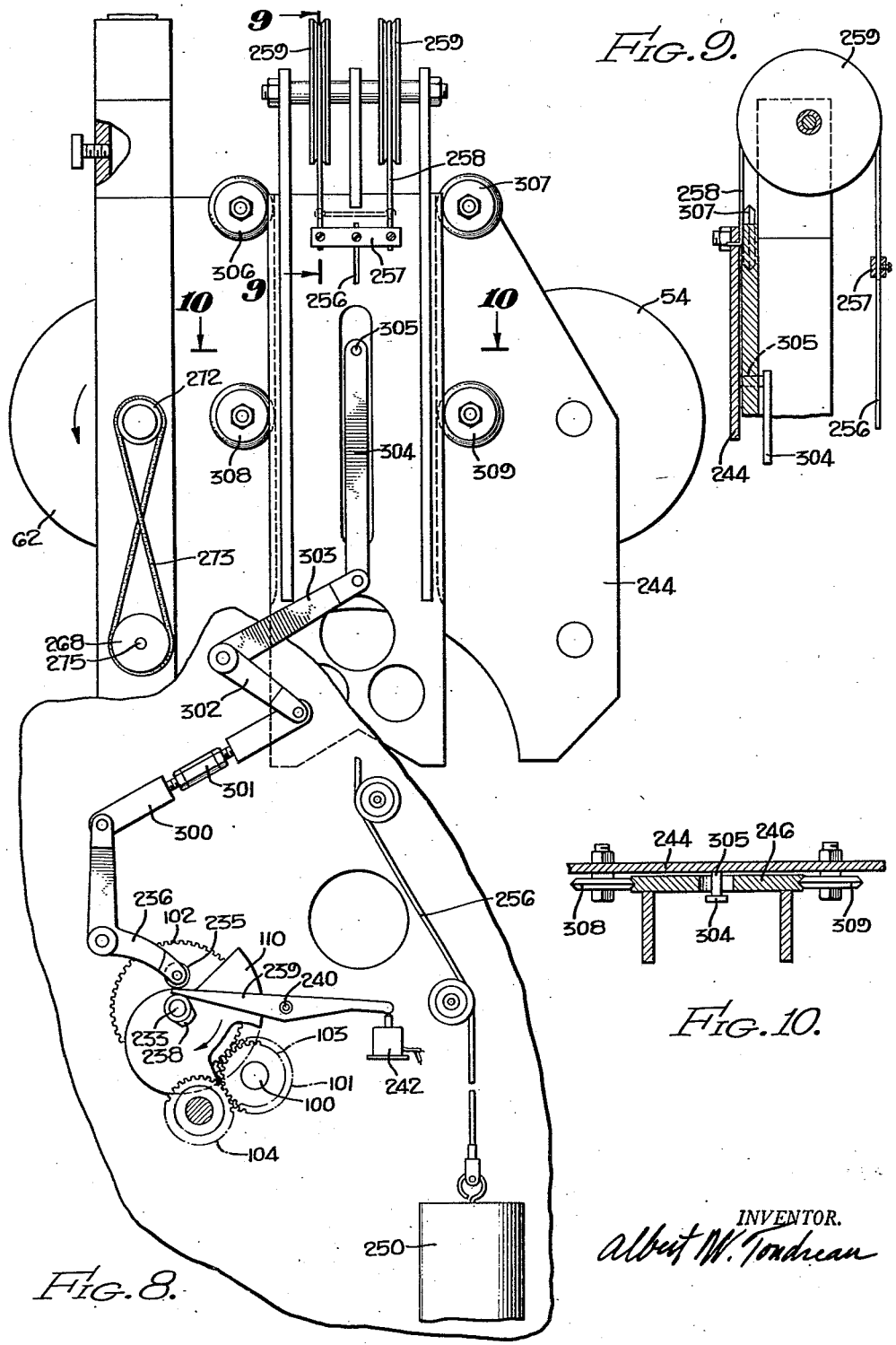

July 2, 1957 A. W. TONDREAU 2,797,626
COLOR FILM TESTER
Filed June 23, 1953 10 Sheets-Sheet 8

INVENTOR.
Albert W. Tondreau

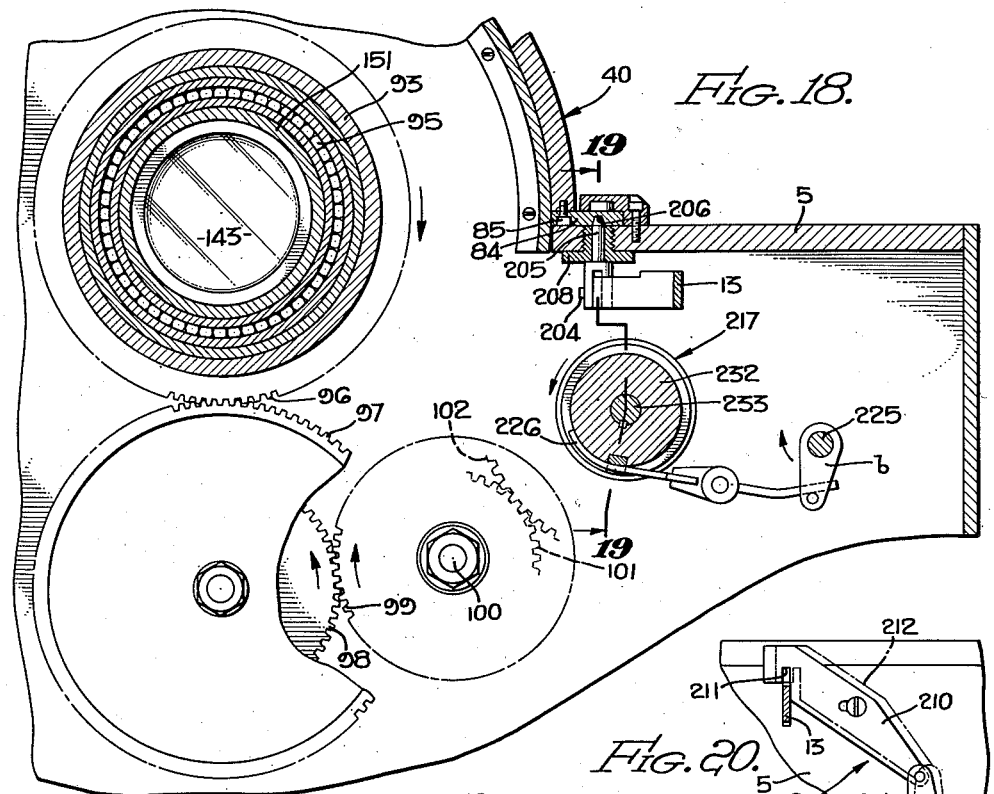
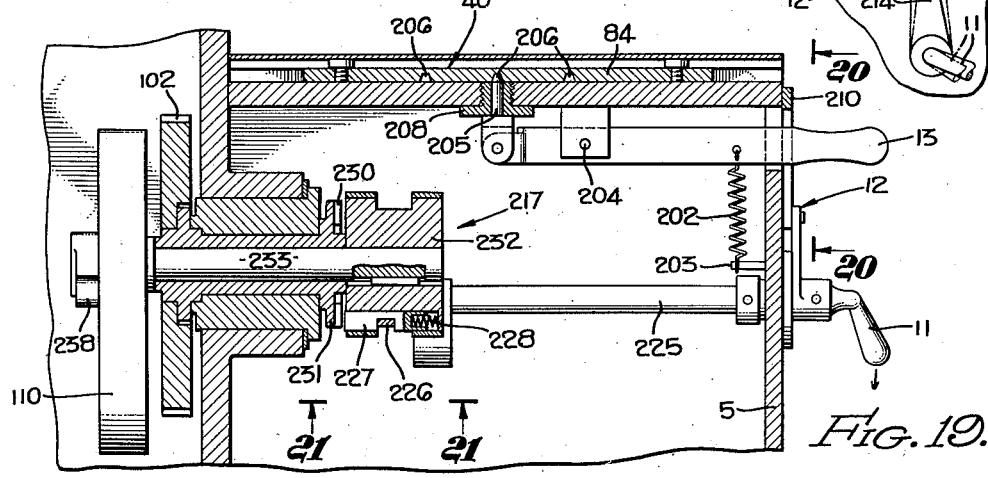
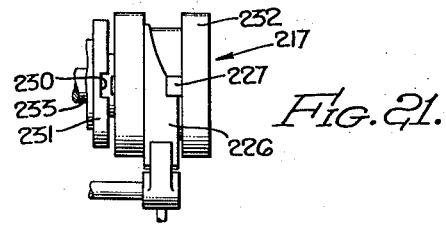

United States Patent Office 2,797,626
Patented July 2, 1957

2,797,626

COLOR FILM TESTER

Albert W. Tondreau, Van Nuys, Calif., assignor to Warner Bros. Pictures, Inc., Burbank, Calif., a corporation of Delaware Application June 23, 1953, Serial No. 363,604

5 Claims. (Cl. 95—75)

This invention relates to testing equipment used in color photography, and particularly to testing equipment for determining the quality and quantity of the printing light used in a color printer, such as disclosed and claimed in co-pending U. S. application, Ser. No. 319,296, filed November 7, 1952, assigned to the same assignee.

In motion picture color photography, it has been found that all sequences photographed do not always have the optimum density or color. It has also been found that, by varying the intensity and quality of the printing light, many inequalities between the various sequences can be corrected during the printing operation. The variations in light intensity or quality of light are generally obtained by varying the exposing aperture rather than the light intensity, the latter being undesirable since light intensity changes generally involve color variations. To obtain the proper color correction, filters are inserted in the light beam between the lamp and exposure aperture. It has also been found that all emulsions on which the prints are made vary from roll to roll, and the present equipment provides a test to determine what correction must be made for variations in emulsions.

The equipment is automatic to the extent that after the equipment is adjusted and a switch is thrown, the apparatus makes a plurality of exposures along a strip of raw print stock, and then advances a new strip of raw stock in ready position for the next test. The tester exposes one strip length with multiple variations in color hues with a constant intensity light, and another strip is exposed through a neutral filter with varying light exposures. The same number of filters are used each time to provide equal refraction and absorption losses for each exposure, clear filters being used when color filters are not required. A neutral filter is a combination of three color filters, such as cyan, yellow, and magenta, which provide a neutral gray color.

The principal object of the invention, therefore, is to rapidly and accurately determine the correct printing light for printing colored motion picture film.

Another object of the invention is to facilitate the testing of color motion picture negatives to determine the correct quality and quantity of light to be used for printing the negatives.

A further object of the invention is to provide an improved color film tester, which operates automatically to make a series of exposures after the original adjustments have been made.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 8 is a diagrammatic view showing the drive mechanism for making the exposure.

Fig. 9 is a detail view of the gravity control taken along the line 9—9 of Fig. 8.

Fig. 10 is a detail view of the film print advancing mechanism taken along the line 10—10 of Fig. 8.

Fig. 17 is a cross-sectional view of the dashpot used in the invention taken along the line 17—17 of Fig. 2.

Fig. 18 is a diagrammatic view showing the gear drive for the print stock advancing mechanism.

Fig. 19 is a cross-sectional view taken along the line 19—19 of Fig. 18.

Fig. 20 is a detail view of the safety mechanism of the starting switch taken along the line 20—20 of Fig. 19, and Fig. 21 is a detail view of the cyclic drive control taken along the line 21—21 of Fig. 19.

Figure 1:
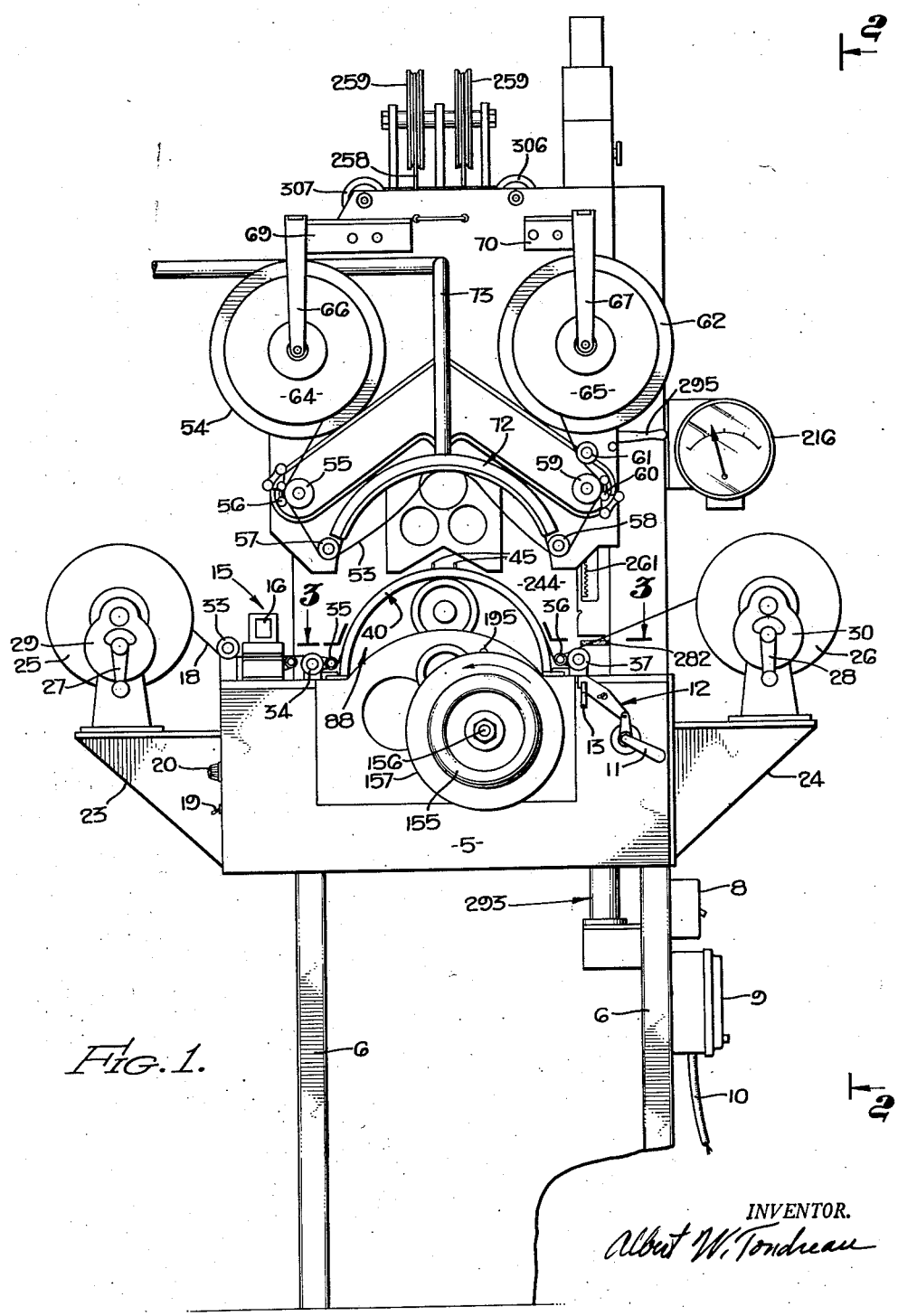
Fig. 1 is a front elevational view of a film tester embodying the invention.

Referring now to the drawings, in which the same numerals identify like elements, a mounting base 5 is supported on standards, such as shown at 6, on one of which are the main exposure lamp and motor control switches 8 and 9 and a cable 10 feeding power thereto. On the base 5, is mounted a clutch control handle 11 with interlinkage 12 for controlling an exposure control handle 13, (see Figs. 19 and 20). On the other side of the plate 5, is an inspection and framing unit 15 having a view plate 16 for the purpose of viewing the images on the negative film 18 when projected thereto. The projecting lamp switch for the viewer is shown at 19, and the intensity thereof is controlled by the rheostat knob 20.

On the triangular brackets 23 and 24 are mounted film reels 25 and 26, which are driven by hand with respective handles 27 and 28 through gear mechanisms 29 and 30, respectively. The film 18 is supplied from one reel and taken up by the other and vice versa. The film 18 passes under guide roller 33 through the inspection and framing unit 15, over rollers 34, under rollers 35 and 36, and over roller 37, the film passing over the film exposure semi-circular plate 40. This plate is provided with three parallel film positions between the runners 41, 42, 43, and 44, these runners being provided with film guide pins such as shown at 45 positioned in elongated holes in the runners.

Figure 4:
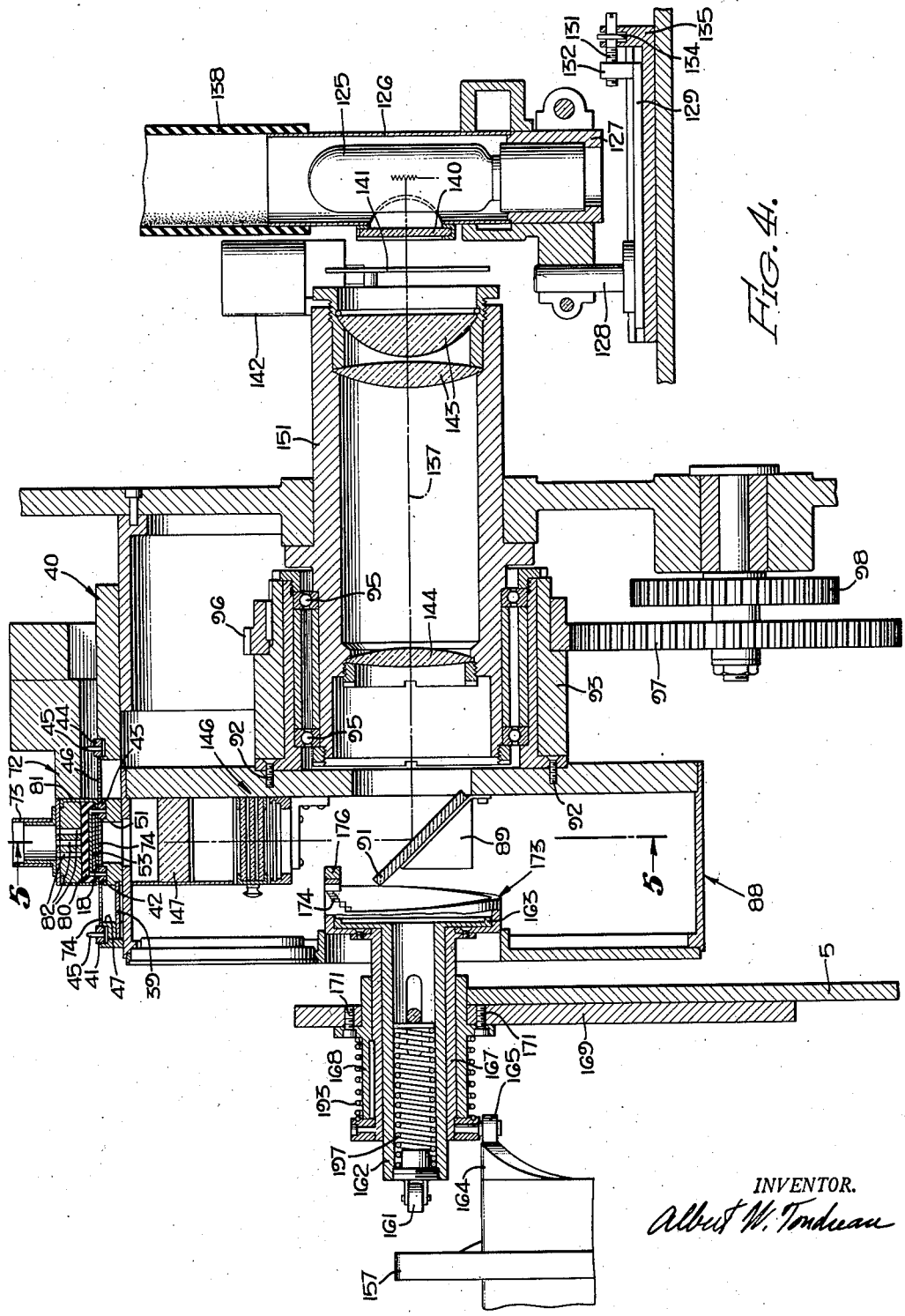
Fig. 4 is a medial vertical section of the portion of the invention shown in Fig. 3.
Figure 7:
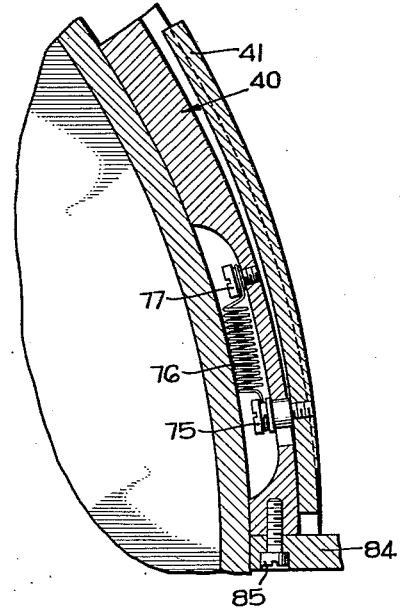
Fig. 7 is a detail view of the drum taken along the line 7—7 of Fig. 3.

In Fig. 7, the manner of mounting the runners 41—44, inclusive, is illustrated as well as the manner of raising the film off the glass covering 74 (see Fig. 4), when it is desired to advance the negative. As shown in Fig. 7, adjacent the end of each strip 41 is a pin 75, to which is anchored the end of a spring 76, the other end of which is anchored to a pin 77 attached to the plate 40. By urging the ends of the runners 41 toward one another, the runners are urged upwardly so that only the outer edges of the film are in contact with the runners during the advancing period. When the pressure plate 72 presses the print stock 53 on the negative, the runners are depressed so that the negative lies flat on the glass plate 74. As shown in Fig. 4, the runners 41 and 44 are shown raised, while the runners 42 and 43 are shown depressed. Also shown in Fig. 4 is the pressure plate 72 with its sponge rubber covering 80 and felt covering 81. Air vents through the pressure plate are shown at 82. Fig. 7 also shows the mounting of the plate 40 to its base 84 by screw 85. The plate 40 is movable laterally so that the film 18 may be positioned between any two adjacent runners and guided thereover by the pins 45.

Between the runners 41 and 42, are shown a plurality of apertures 47, under which are positioned a plurality of color filters, such as shown at 39. (See Figs. 4 and 5.) These filters are gelatin-type Kodak color correction filters which are rated 2.5, 5, 10, 20, 30, and 40, in each particular color, such as magenta, yellow, and cyan. In the center filter pack shown at 49, a neutral color such as gray is generally obtained by using number 10 filters from each of the three just mentioned colors. Sometimes, however, a slight change in one or the other colors may be required to obtain the desired neutral gray. On each side of the neutral color aperture 49, the filters are graduated to produce variations produced by various combinations of the filters, so that as an exposure is made from the first to last filter, it will go from one extreme to the other in color hues. Where fewer than the maximum number of color filters are required, the remainder of the filter pack is made up of clear filters to maintain the reflection and absorption losses constant for each aperture.

Between the runners 42 and 43, are shown apertures 51, which are fewer in number than apertures 47, but are all that are required to produce the necessary lamp intensity or quantity test. Under each one of the apertures 51 are also placed the same filters requiring the same filter combination used at the neutral filter 49. A negative is placed over the apertures 51 and the positive stock is printed through these apertures and through varying size light apertures in a manner to be described later. Thus, between the runners 41 and 42 and 42 and 43, the negative may be tested for color quality and for density.

The film position between runners 43 and 44 is used to obtain a sensitometric test, wherein the usual form of sensitometer strip with varying densities between frames is placed between the runners 43 and 44 and the print stock exposed therethrough. The negative in this position lies on a transparent glass plate 46 between the runners. Since a color gray scale negative of the three primary colors is positioned on the plate 46, through which the positive is exposed, this test will determine the character of the emulsion on the print stock with respect to the color response in each color. The semi-circular plate 40 may be shifted laterally to position each group of apertures between the guide rollers, and, as mentioned above, the negative 18 can be advanced forwardly or backwardly by means of the reel mechanisms mounted on the brackets 23 and 24.

Figure 2:
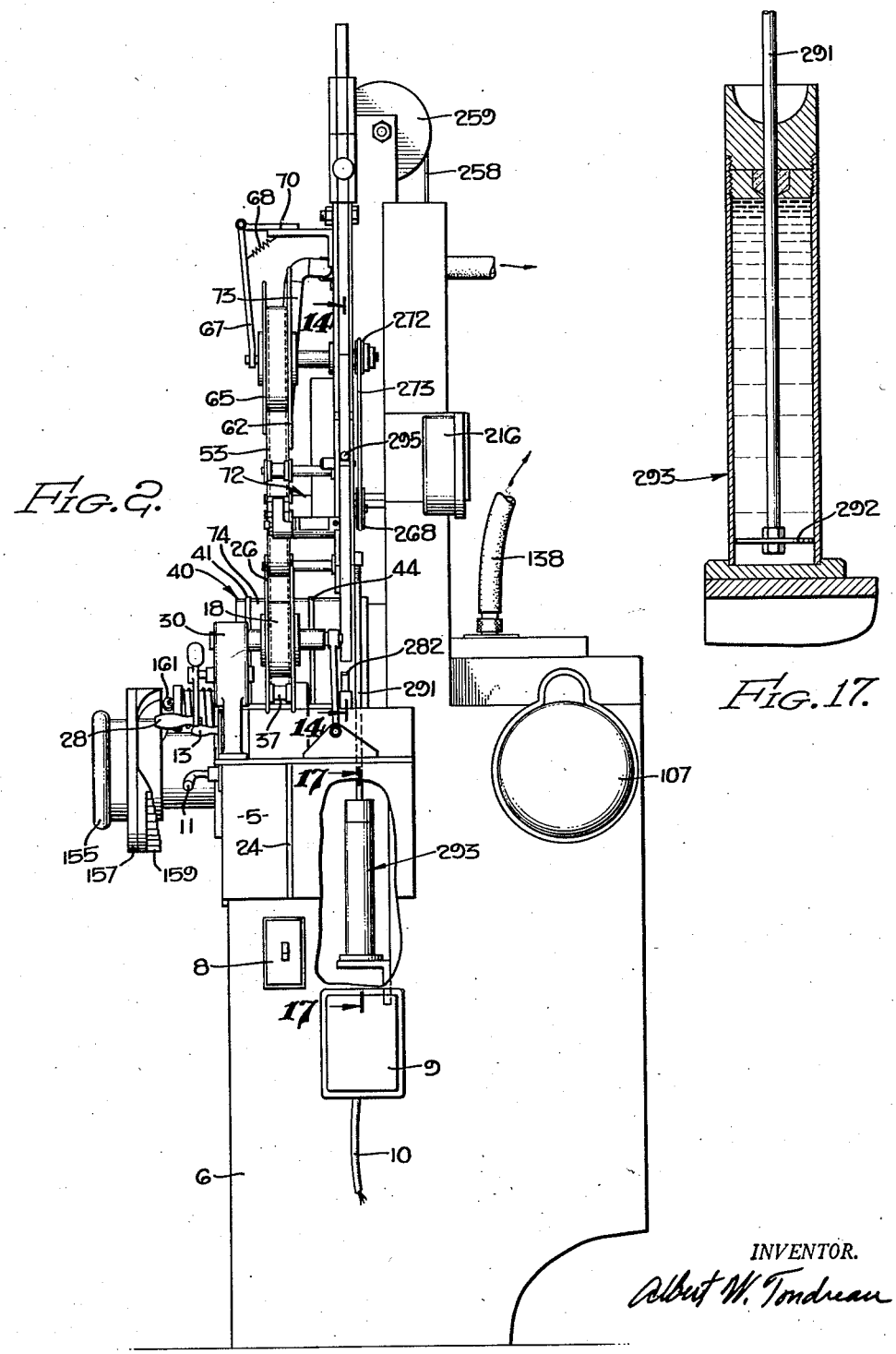
Fig. 2 is a side elevational view taken along the line 2—2 of Fig. 1.

Before explaining the details of the print stock feed mechanism, it is desired to mention that this stock is shown at 53 coming from a supply reel 54 over a sprocket 55 with pad rollers 56, over guide roller 57, over guide roller 58, around a drive sprocket 59 having pad roller 60, around a guide roller 61, to a take-up reel 62. As shown in Fig. 2, the film is held on the reels by plates 64 and 65 hinged on arms 66 and 67, respectively, which are biased by springs such as shown at 68 to brackets 69 and 70. This type of construction provides quick loading and unloading of the reels on the spindles. The film 53 is held at the center of an arcuate pressure plate 72 by a vacuum produced by a pump attached to a pipe 73. With a mechanism to be described, the raw stock 53 between the rollers 57 and 58 is moved downwardly and placed over the negative 18 whenever an exposure is to be made.

The means for making the exposures after the negative and raw stock are brought into contact will now be explained. Under the semi-circular plate 40 is a rotatable drum 88 on which is mounted by a bracket 89 a right-angle light reflecting mirror 91. (See Fig. 4.) The drum 88 is mounted by screws 92 on a cylinder 93, the cylinder being rotatable on bearings 95. The cylinder is driven by gear 96 mounted thereon which is in mesh with a gear 97 rotated by a gear 98, in mesh with a driving gear 99 on jack shaft 100, on which are gears 101 and 103. Gear 101 is in mesh with a gear 102, and gear 103 is in mesh with drive gear 104. Drive gear 104 is driven through a gear box 106 by a motor 107. The gear 102 drives a cam 110 through the clutch 217.

The exposing light is obtained from a lamp 125 within a housing 126 mounted on a base bracket 127 supported by a post 128 mounted on an adjustable base 129 adjustable by a screw 131 passing through a lug 132 of the base 129 and having a rotatable, fixed collar 134 in the slot of the base plate 135. Thus, the lamp may be moved axially along the optical axis 137. A hose connection 138 will draw air past the lamp for cooling it. Light from the lamp passes through a heat absorption unit 140, past a dowser shutter 141 when opened by the solenoid 142, past condensing lenses 143, through projection lens 144, to the mirror 91, through a filter pack 146, which is used to obtain the same light quality from each lamp, and through a cylindrical projection lens 147 to one of the apertures 41, 51, or the glass plate between runners 43 and 44. The optical units 143 and 144 are housed in a cylinder 151.

Figure 6:
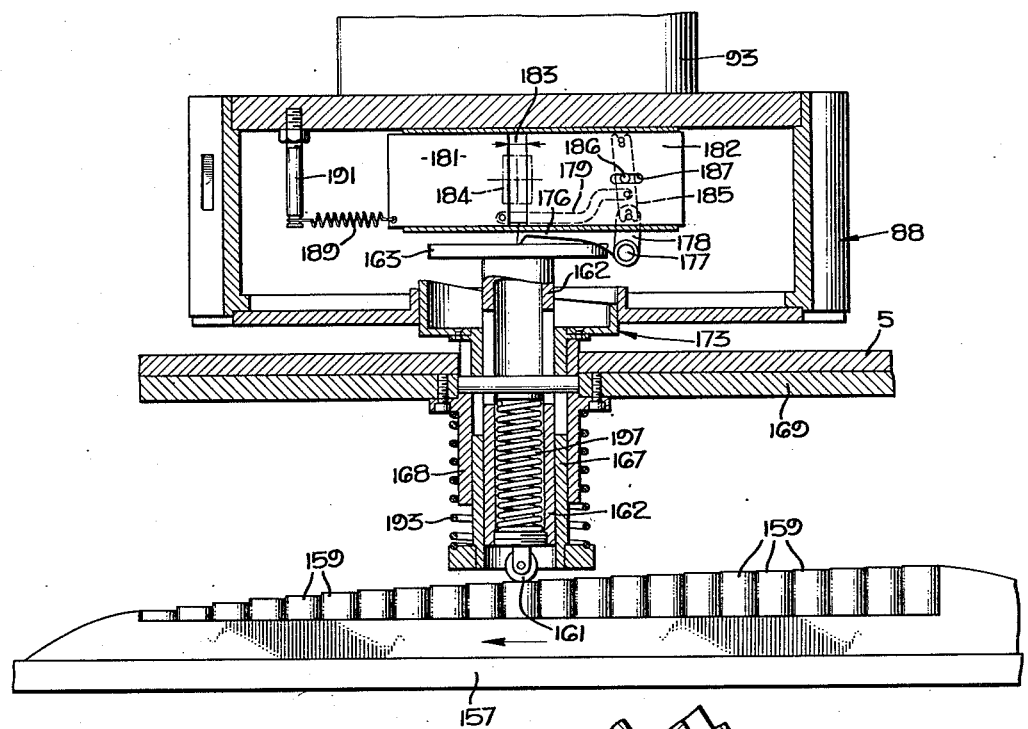
Fig. 6 is a detail cross-sectional view taken along the line 6—6 of Fig. 5.

As mentioned above, the filters of apertures 47 are subjected to the same light intensity, but through differently colored filter packs, while each frame of the films, over apertures 51, is given a different light intensity but a constant light quality. Assuming that the plate 40 is moved laterally so that the negative lies over apertures 51 and the positive stock 53 is in contact therewith, the system is adjusted to provide increasing amounts of exposures from the first to the last aperture. This is accomplished by the mechanism shown in Figs. 1, 3, 4, and 6, wherein a hand wheel 155, rotatable on a shaft 156, carries thereon a plate 157, having, over the partial circumference thereof, a series of different length pins 159 to form a stepped cam. Over a certain portion of its complete revolution, a roller 161 contacts these pins and axially moves a cylinder 162, on the end of which is a cylindrical plate 163. (See Fig. 6 for one adjustment of cylinder 162 and plate 163.) In another rotational position of the plate 157, a cam 164 makes contact with a roller 165, attached to a cylinder 167, positioned within a cylinder 168, attached to the casting 169 of base 5 by screws 171. The cylinder 167 is shown in an extreme position in Fig. 4, in which position a cam 173 having steps 174 thereon has been moved to its extreme position. In contact with the cam 173, is an aperture adjusting arm 176, which, in Fig. 6, is shown in contact with the edge of the cam 163 of cylinder 162. However, when the cylinder 162 is moved to its extreme left-hand position, as shown in Fig. 4, and the cylinder 167 is moved inwardly, the arm 176 contacts the rim of cam 173 rather than cam 163.

The arm 176 is pivoted at 177 and moves an arm 178 to shift shutters 181 and 182 toward and away from each other, as shown by the arrow 183, to vary the amount of light passing through one of the apertures as shown by the broken line 184. The linkage between the shutters is shown by the dotted line arm 179 connecting shutter 181 with an arm 185 pivoted at 186. The upper end of the arm moves shutter 182. The shutter 182 slides on the pin 186 through the elongated slot 187. The shutters are biased by a spring 189 connected to shutter 181 and to an anchor pin 191.

Now, as the drum 88 rotates, the mirror 91 rotates and the end of the arm 176 rotates over the edge of cam 173. As it does so, it will provide stepped exposures for each of the apertures 51 as the exposing cycle is performed. When the positive so exposed is printed, the correct printing light intensity is provided.

Figure 3:
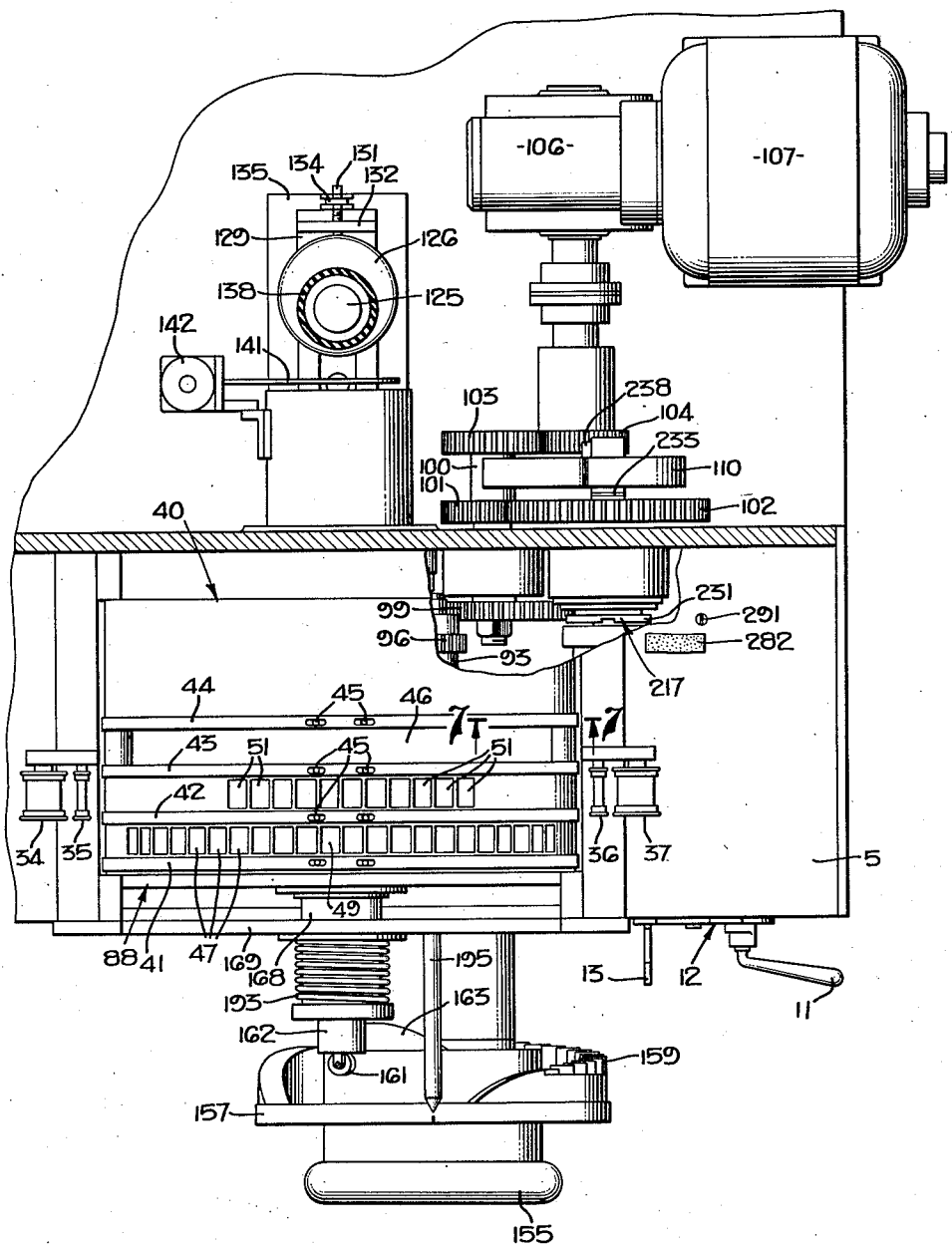
Fig. 3 is a plan view, partly in cross-section, taken along the line 3—3 of Fig. 1.

After the desired exposure has been determined, the wheel 155 is then rotated to permit the cylinder 167 to be urged by spring 193 to its extreme left-hand position and the roller 161 is now brought into contact with the pins 159 and to the pin which will provide the exposure determined by the cinex test just described. It should be mentioned that when this test is made, a pointer 195 indicates the correct position of the wheel 155, as shown in Fig. 3. Pressure on the roller 161 by the pins 159 moves the cylinder 162 against the resiliency of a spring 197 to move the plate 163 to a position such as shown in Fig. 6. This position of plate 163 will now provide the desired opening between shutters 181 and 182 and the proper exposure for the color hue test. When the wheel 155 has been so adjusted, another cyclic operation is obtained and an exposure at a constant light intensity through apertures 47 is made. When the positive so exposed is printed, the correct color of the printing light is found by checking the different frames which were exposed with light of different hues. As mentioned above, the semi-cylindrical plate 40 is moved laterally to place the negative film over the desired apertures between the selected runners 41, 42, 43, and 44.

The means for correctly positioning the plate 40 is shown in Fig. 19, and comprises a handle 13, biased by a spring 202 anchored at 203, the handle being pivoted at 204. The handle extends through the front plate 5, as shown in Figs. 1 and 3. At the inner end of the handle 13, is mounted a pin 205 adapted to fit in any one of three apertures 206. The pin 205 is mounted for axial movement in a screw 208, and, as shown in Fig. 19, is mounted in the central aperture 206 to correspond with Fig. 3. To insure that the starting cycle cannot be made without the plate 40 being in its proper position, the handle 13 has bearing against it an arm 210 of the linkage 12 having a notch 211 therein, the notch accommodating the handle 13 when the plate is in a properly adjusted position, as shown in Fig. 19. However, if the plate 40 is not properly positioned, the end of handle 13 is in its upper position and the arm 210 cannot take the position shown by the broken lines 212 in Fig. 20. To the arm 210 is connected an arm 214 of the cyclic starting handle 11. If the arm 13 is not in the notch 211 of arm 20, handle 11 can be moved to actuate the clutch for starting the drum 88 to expose the film. Thus, the positive positioned pressure plate 72 cannot be lowered unless the negative positioning plate 40 is in its correct position.

It is to be understood that the motor 107 is running continuously, and that the lamp 125 is burning continuously, the voltage thereon being indicated by a voltmeter 216. However, the dowser shutter 141 eliminates light from the films and the clutch unit is not connected until an exposure is to be made, which will now be described. (See Figs. 19 and 21.)

Referring now particularly to Figs. 1, 3, 8, 18, 19, and 21, when it is desired to make an exposure, the handle 11 is moved downwardly, as shown by the arrow in Fig. 19. Now, if the pin 205 is in its proper position, the handle 11 will rotate shaft 225, which will remove a stop member 226 from a groove in the element 232 of clutch 217. The stop member 226 holds a key 227 under the pressure of a spring 228 from entering a notch such as 230 of the clutch member 231. As mentioned above, gear 102 continuously drives the clutch member 231, which will drive the member 232 when the key enters the notch 230. The clutch member 232 will rotate cam 110 on shaft 233 one revolution before the tapered portion of stop member 226 shifts the key 227 to the position shown in Fig. 21. On cam 110 rides a follower 235 on the end of an arm 236. Also positioned on the shaft 233 of the cam 110, is a cam 238 on which the end of an arm 239 rests, arm 239 being pivoted at 240 and having its other end in contact with a microswitch 242. Rotation of the shaft 237, therefore, will close the microswitch 242, which energizes solenoid 142 and raises the dowser shutter 141 to permit light to be reflected from the mirror 91 to the apertures in succession as the drum 88 is rotated.

Figure 5:
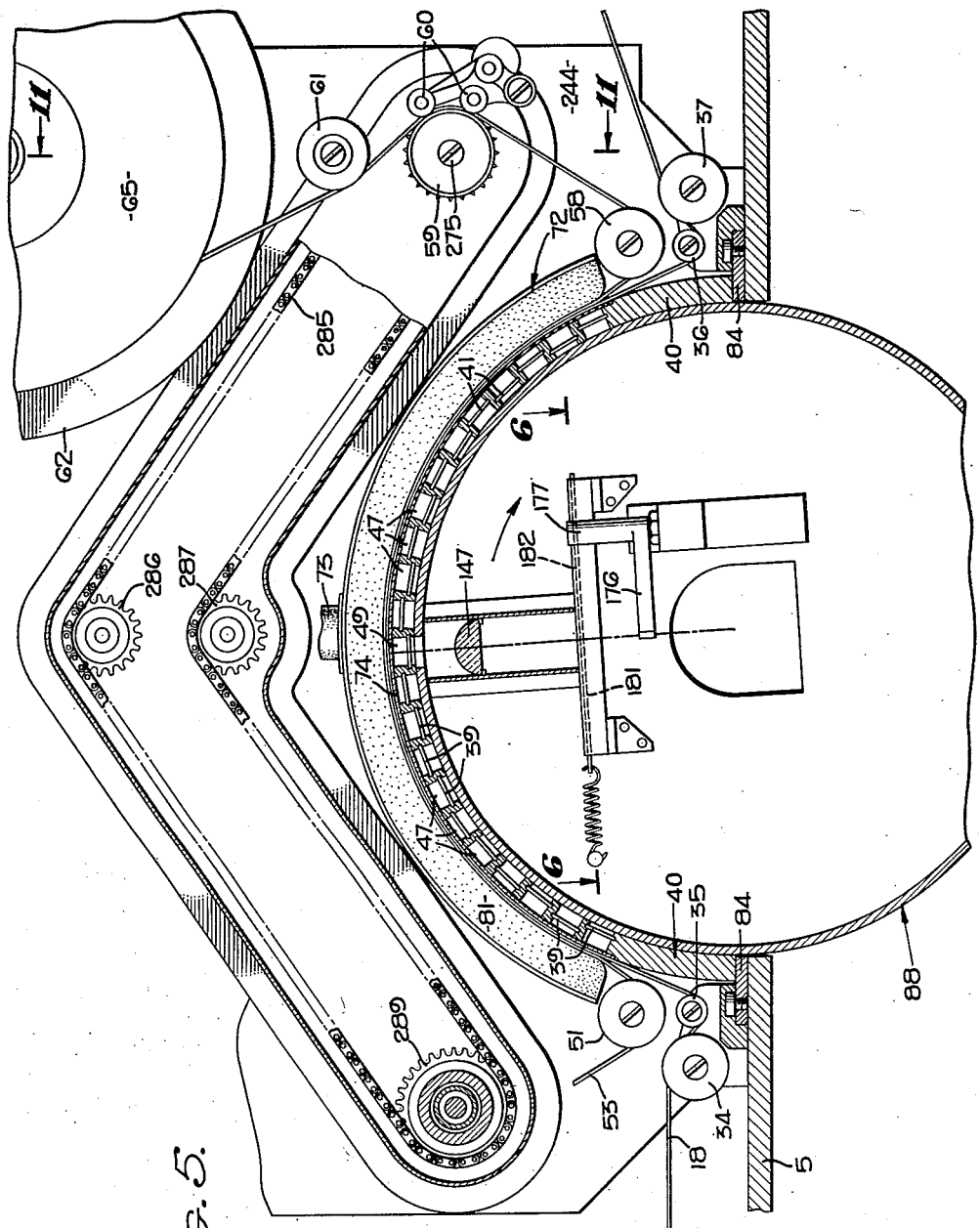
Fig. 5 is a cross-sectional view taken along the line 5—5 of Fig. 4.
Figure 11:
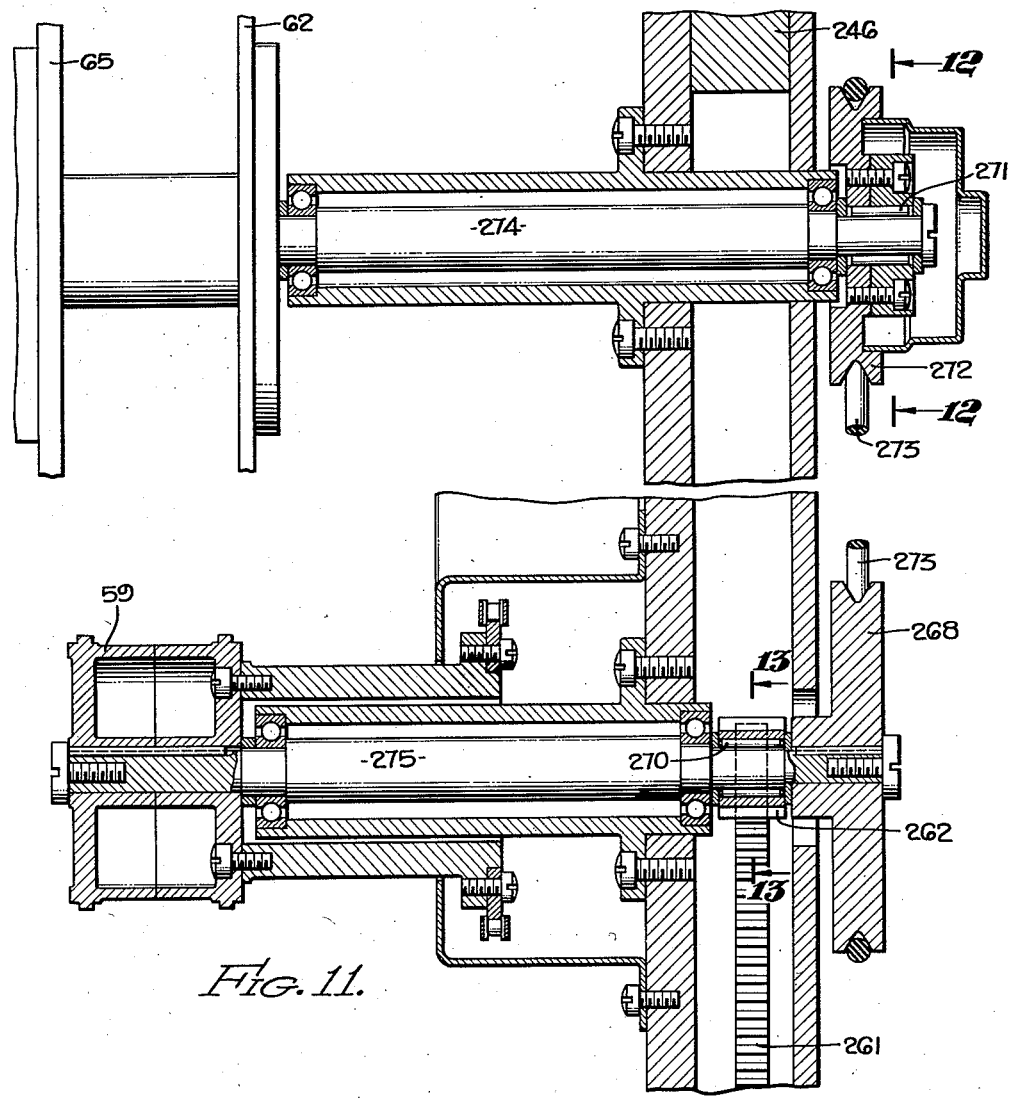
Fig. 11 is a cross-sectional view of the sprocket and take-up reel drive for the film print stock taken along the line 11—11 of Fig. 5.
Figure 12:
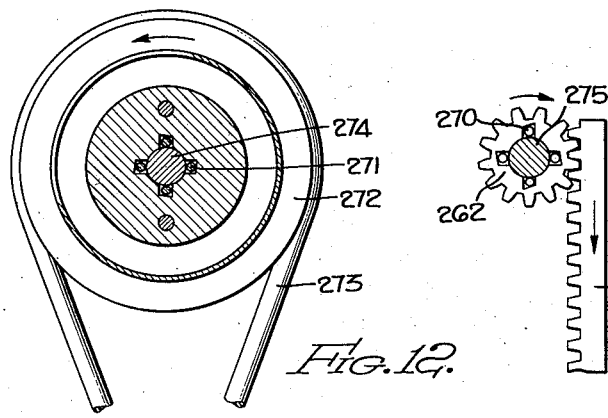
Fig. 12 is a detail view of the take-up reel drive taken along the line 12—12 of Fig. 11.
Figure 13:
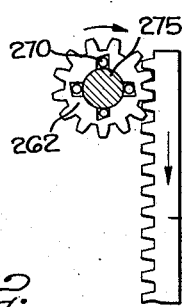
Fig. 13 is a detail view of the rack and pinion drive taken along the line 13—13 of Fig. 11.
Figure 14:
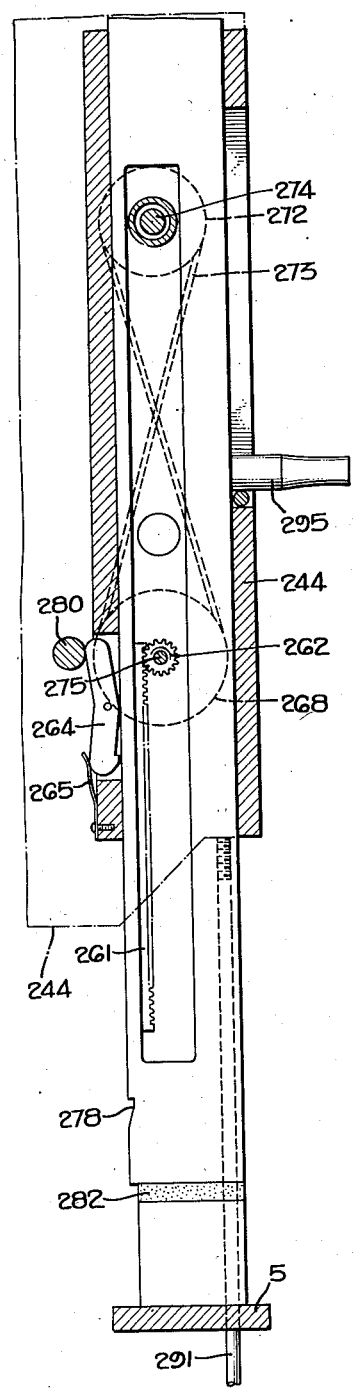
Fig. 14 is a detail view of the print stock advancing mechanism taken along the line 14—14 of Fig. 2.
Figure 15:
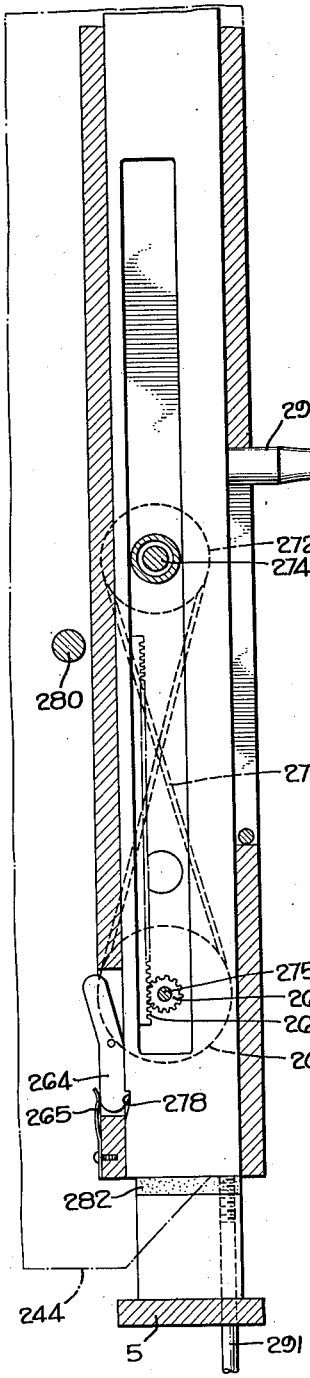
Figs. 15 and 16 are side views showing two adjusted positions of the print stock advancing mechanism shown in Fig. 14.

Before the dowser shutter is removed from the light path, the cam 110 will lower the plate 244, which carries the reels 54 and 62 and the other mechanism for the film 53 to the position in Fig. 5. This is accomplished through the linkage which includes a rod 300 with its turnbuckle 301, a pair of arms 302 and 303, and a rod 304 attached to the plate 244 at 305. The plate 244 is counterbalanced by a weight 250 on a cable 256, which is connected to a single tree 257 having its ends connected to cables 258 passing over sheaves 259. Thus, as the plate 244 is pulled downwardly by the cam, the weight 250 is raised. As this mechanism is pulled downwardly, the film 53 is placed over the negative 18, as shown in Fig. 5. Also pulled downwardly is a pinion 262 in mesh with a rock 261. The normal position of these elements is as shown in Fig. 14 with the pinion 262 at the upper end of the rack 261 mounted on plate 244 guided by tapered wheels 306–309, inclusive. As the plate 244 is moved downwardly, a hook member 264 biased by a spring 265 is also moved downwardly. When the pinion 262 on plate 244 moves downwardly along rack 261, the gear 262 is rotated. The gear 262 drives a pulley 268 in the direction shown in Fig. 8, but because of the overrunning clutches 270 and 271 (see Figs. 11, 12, and 13), the pulley 268 is not rotated. Thus, a pulley 272 connected to pulley 268 by a belt 273 will also not rotate. There will, therefore, be no rotation of the shaft 275 of pulley 268, which drives sprocket 59, or the shaft 274 of pulley 272, which drives reel 62. So, the film 53 is not advanced during the placement of the film 53 on the negative. Now, when the plate 244 has reached its lower extreme position, the hook 264 will be positioned in a notch 278 of the rack member. (See Fig. 15.) This occurs during approximately one-half of the rotation of the cam 110. Thus, the dowser shutter 141 is removed to expose the films to the light through the respective apertures according to the position of the negative as the positive film 53 is in contact with the negative 18.

Figure 16:
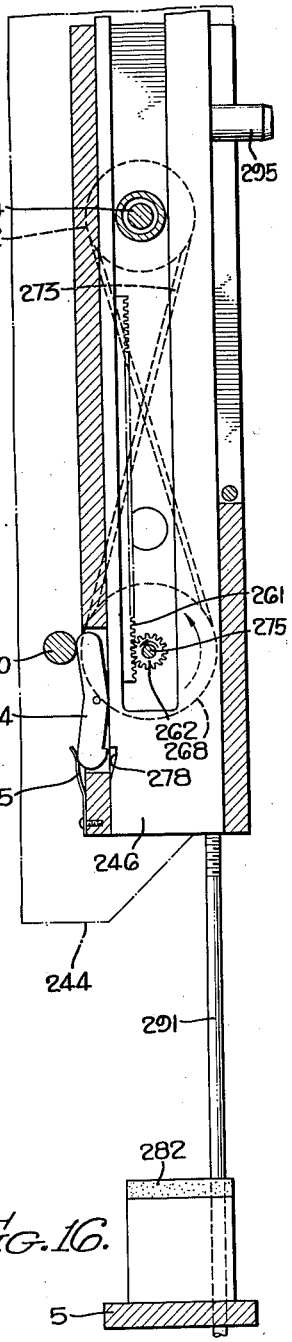

When the cam 110 has made one full revolution, the follower 235 will drop to the position shown in Fig. 8 and the weight 250 will carry the film mechanism on the plate 244 along with rack plate 246 to its upper position shown in Figs. 1 and 16. However, when the upper position is reached, one end of the hook 264 will contact a stop 280, as shown in Fig. 16, and thus, release the rack member 261. Under its own weight, the rack member will drop downwardly to the position shown in Figs. 14 and 15 and be stopped by a resilient bumper 282. On its way down, the rack will rotate the pinion 262 in the reverse direction to that discussed above, which will rotate sprocket 59 and reel 62 to advance a new strip of positive 53 into position, as shown in Fig. 1.

Fig. 5 shows a chain 285 passing over idler sprocket wheels 286 and 287 to a sprocket wheel 289, which drives the sprocket 55. As shown in Figs. 2 and 17, the rack member 261 is connected by a rod 291 to the piston 292 of a dashpot 293 for cushioning the member when it returns to position under its own weight. In the event of manual operation, a handle 295 is provided, this handle being mountable in the position shown in Figs. 14, 15, and 16.

From the above description of the tester, it will be observed that three tests can be readily made substantially automatically. That is, to obtain a sensitometer test, a gray scale color negative is placed over the glass plate 46 and an exposure of a particular positive is made with constant intensity light. The positive strip is then measured to determine the color response for a particular emulsion. The filter group 146 will then be adjusted accordingly. When the negative is placed over apertures 51 with the same color filter for each aperture, the proper light intensity is determined by subjecting the film to a varying light exposure obtained by varying the separation between shutters 181 and 182. When the negative is placed over apertures 47, in which graduated color filters are used, the correct amount and selection of color filters for printing the negative to a particular position is determined, these filters being inserted automatically in the printer disclosed and claimed in my co-pending application above mentioned. In each case, the necessary length of positive film is advanced automatically and automatically positioned over the negative, the different exposure positions being obtained by the axial positioning of the plate 40 by the wheel 155.

I claim:

1. A color film testing system comprising a semi-circular plate having a plurality of parallel film positions thereon, one of said positions including one series of light exposing apertures, another of said positions including a second series of light exposng apertures, and a third of said positions including a light exposing transparent plate, means for adjusting said first mentioned plate axially, means for advancing a negative film in one of said positions over said first mentioned plate, means located above said first mentioned plate for positioning a positive film over said negative film when in one position on said first mentioned plate determined by the axial adjustment of said first mentioned plate, said first mentioned apertures having filters adjacent thereto graduated in different colors, said second apertures having color filters of the same color adjacent thereto, a light source, means for projecting light from said source to said apertures in serial order, and means for periodically projecting light on said last mentioned means, said means for positioning said positive film on said negative film comprising a supply reel and a take-up reel therefor, a pair of sprockets between said reels for advancing a predetermined amount of said positive film from said supply reel to said take-up reel, a rack and pinion mechanism for rotating said sprockets, and a cam mechanism for moving said reels and said rack and pinion mechanism.

2. A color film testing mechanism comprising a semi-circular film supporting plate for supporting film at a plurality of parallel positions thereon, means for positioning a negative at one of said positions, means for positioning a positive film in contact with said negative on said plate, a series of apertures in said plate through which said positive is exposed through said negative in serial order, a plurality of filters graduated in color adjacent said apertures and through which said exposures are made, and means for impressing light through said filters and to said negative and positive films, said last mentioned means including a light source, a rotatable mirror for receiving and directing light to said films, a shutter, and a motor for rotating said mirror for impressing light to said apertures in serial order and for permitting said light to reach said mirror over a predetermined time period.

3. A color film testing mechanism comprising a semi-circular film supporting plate for supporting film at a plurality of parallel positions thereon, means for positioning a negative at one of said positions, means for positioning a positive film in contact with said negative on said plate, a series of apertures in said plate through which said positive is exposed through said negative in serial order, a plurality of filters graduated in color adjacent said apertures and through which said exposures are made, and means for impressing light through said filters and to said negative and positive films, said means for positioning a positive film on said plate being a pair of positive film reels, a pair of sprockets for advancing said film between said reels, drive means for said sprockets, a motor for moving said sprockets, reels, and drive means to position said positive film on said negative film, said drive means including a rack and pinion, said pinion driving one of said sprockets when moved in a certain direction along said rack.

4. A color film tester for determining an emulsion characteristic and the proper exposing light from both the intensity and color standpoints comprising a semi-circular plate having three parallel film positions, one of said positions having a row of apertures with filters varying in color, another of said positions having a row of apertures, each having a color filter of the same hue, and another of said positions having a transparent plate, means for adjusting said semi-circular plate axially to accommodate a negative film at said second mentioned position, means for positioning a positive film on said semi-circular plate in contact with said negative, and means for varying the quantity of light passing through said apertures, said last mentioned means including a rotatable mirror for deflecting light to said apertures, a light source, a shutter between said light source and said mirror, and cam operated means for removing said shutter from between said light source and said mirror.

5. A color film testing mechanism comprising a plate for supporting film in a plurality of parallel positions, means for adjusting said plate axially to position said film at one of said positions, a source of light, means for moving a light beam along said film when in one of said positions, a pair of shutters in said light path, a stepped cam, means interconnecting said cam and said shutters for varying the separation of said shutters as said light beam is moved along said film, means being provided above said plate for positioning a second film in contact with said first mentioned film, said means including a pair of film reels, a pair of sprockets for advancing said second film between said reels, a rack and pinion combination, means connecting said pinion to one of said sprockets, translation of said reels and sprockets placing said film in contact with said first film, and means for moving said rack to rotate said pinion and sprockets when said reels and sprockets are returned to their position above said first mentioned film.

References Cited in the file of this patent

UNITED STATES PATENTS

| | | |
|---|---|---|
| 1,422,665 | Chanier | July 11, 1922 |
| 1,821,399 | Owens | Sept. 1, 1931 |
| 1,883,884 | Doran | Oct. 25, 1932 |
| 2,001,280 | Marx | May 14, 1935 |
| 2,464,761 | Haff | Mar. 15, 1949 |
| 2,474,958 | Richards | July 5, 1949 |
| 2,525,522 | Capstaff | Oct. 10, 1950 |
| 2,583,342 | Reeves | Jan. 22, 1952 |
| 2,616,331 | Pavelle | Nov. 4, 1952 |
| 2,711,121 | Barsam | June 21, 1955 |

OTHER REFERENCES

Herrnfeld: "Printing equipment for Ansco color film," pp. 454–463, in Journal of the Society of Motion Picture and Television Engineers, vol. 54, No. 4, April 1950.